(12) United States Patent
Alpert

(10) Patent No.: US 6,907,417 B2
(45) Date of Patent: Jun. 14, 2005

(54) SYSTEM AND METHOD FOR CONVERTING NODE-AND-LINK KNOWLEDGE REPRESENTATIONS TO OUTLINE FORMAT

(75) Inventor: Sherman R. Alpert, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 10/107,728

(22) Filed: Mar. 28, 2002

(65) Prior Publication Data

US 2003/0177136 A1 Sep. 18, 2003

(51) Int. Cl.[7] ............................................. G06F 17/00
(52) U.S. Cl. ...................................................... 706/55
(58) Field of Search .......................................... 706/55

(56) References Cited

U.S. PATENT DOCUMENTS

| | | | | |
|---|---|---|---|---|
| 4,815,005 A | * | 3/1989 | Oyanagi et al. .............. | 706/55 |
| 5,506,937 A | * | 4/1996 | Ford et al. .................... | 706/11 |
| 5,937,400 A | * | 8/1999 | Au .............................. | 706/55 |
| 2003/0130976 A1 | * | 7/2003 | Au .............................. | 706/55 |

OTHER PUBLICATIONS

Sherman R. Alpert and Keith Grueneberg; Concept Mapping with Multimedia on the Web; 2000; Journal of Educational Multimedia and Hypermedia, 9(4), 313–330.

Sherman R. Alpert and Keigh Grueneberg; Multimedia in Concept Maps: A Design Rationale and Web–Based Application; In Proceedings of ED–Meida 2001, World Conference on Educational Multimedia, Hypermedia and Telecommunication, Jun. 25–30, 2001; Association for the Advancement of Computing in Education (AACE).

Robert B. Kozma; Constructing Knowledge with Learning Tool; NATO ADI Series, vol. F81, Cognitive Tools for Learning, Springer–Verbag Berlin Heidelberg 1992; Chapter 3, pp. 23 to 32.

* cited by examiner

*Primary Examiner*—George Davis
(74) *Attorney, Agent, or Firm*—Keusey, Tutunjian & Bitetto, P.C.; Louis J. Percello

(57) ABSTRACT

A computer-implemented system and method for translating node-and-link knowledge representations to an outline format is disclosed. The representation includes one or more node objects and one or more link objects. Each link object has a "from node identifier" that identifies the node object in a concept map connected to a link's tail and a "to node identifier" identifying the node object in the concept map to which the link object points. A translation program traverses all of the node objects in a node-and-link representation as directed by the link objects by following links out of each node depending of the link objects' "to node identifier" such that an outline is output having node object information and link object information hierarchically interrelated.

27 Claims, 10 Drawing Sheets

SYSTEM AND METHOD FOR CONVERTING NODE-AND-LINK KNOWLEDGE REPRESENTATIONS TO OUTLINE FORMAT

FIELD OF THE INVENTION

The present invention relates to knowledge representation and automated conversion from one knowledge representation format to another. More specifically, the present invention relates to converting a directed, possibly-cyclic, graph of labeled nodes and links, commonly used for visual knowledge representation and known as a concept map or a semantic network, to traditional outline form.

BACKGROUND OF THE RELATED ART

Semantic networks are a well-known knowledge representation mechanism. A semantic network includes nodes representing concepts, objects, actions (these are referred to hereafter as concept nodes or simply nodes), connected by directional links defining the relationships between nodes (See. e.g., Quillian, M. R. (1968). Semantic memory, In M. Minsky (Ed.), *Semantic Information Processing* (pp. 227–270). Cambridge, Mass.: MIT Press). Semantic networks can be, and often are, represented visually/graphically.

When semantic networks are graphically depicted, they are also known as concept maps (See, e.g., Kommers, P. A. M., Jonassen, D. H. & Mayes, J. T. (Eds.) (1992). *Cognitive Technologies for Learning*. Berlin: Springer-Verlag). Hence, a concept map is a visual representation of knowledge of a domain. Concept maps have also been called knowledge maps, semantic maps, webs, and semantic webs (See, Bromley, K. D. (1996). Webbing with Literature: Creating Story Maps with Children's Books (Second Edition). Needham Heights, Mass.: Allyn & Bacon). Concept maps are often drawn with a computer-based editor, so as to share knowledge among people.

Visually, a node may be represented by a geometric object, for example a rectangle or oval, containing a textual label or name. Each relationship link is represented by a line with an arrowhead at one or both ends. In some concept mapping tools, links may also be textually labeled. Together, nodes and labeled links define propositions, which may include assertions about a topic, domain, or thing. FIG. 1 is an example of a concept map where the nodes and link represent the knowledge "birds have wings".

A small number of concept map tools automate the conversion of concept maps to outlines. Many users of concept map tools may also wish to see their ideas/thoughts/knowledge organized in outline form. However, the few existing tools that do such translation elide from the outline much of the important knowledge and information that is contained in the concept map.

Concept mapping tools that include the ability to translate a concept map to outline format include Learning Tool (See Kozma, R. B. (1992). Constructing knowledge with Learning Tool, in P. A. M. Kommers, D. H. Jonassen, and J. T. Mayes (Eds.), *Cognitive Technologies for Learning* (pp. 23–32). Berlin: Springer-Verlag) and INSPIRATION® (Inspiration Software, Inc. (1998). *Classroom Ideas Using Inspiration®: For Teachers by Teachers*. Portland, Oreg.: Inspiration). The most prominent and representative example of prior art is the INSPIRATION® software product. Inspiration is a popular consumer product for computer-based concept mapping. The INSPIRATION® product can produce outlines from concept maps, but there are significant problems with these outlines and these problems are evident in the other concept map tools as well.

First, labels that appear on inter-node links are ignored in Inspiration's outlines; these labels appear nowhere in the outline translation of a map. The labels on links provide a primary source of knowledge in a concept map, the labels define the relationships between two nodes, and without labels on inter-node links, all that is known from the map is that there is some relationship between the connected nodes.

The problem in eliding the labels on inter-node links from the outline translation of a concept map is that because these concept-to-concept relationships provide important semantic information the outline is an impoverished representation of the knowledge contained in the map. If a user believed it important to name the relationship between two concepts, this information ought to be incorporated into the alternative outline representation of that user's concept map.

So, for example, for the concept map shown in FIG. 2a, if the link labels were disregarded in FIG. 2a and only concept nodes were included, a portion of the outline view may appear as:

animal
I. skin
II. oxygen
. . .

However, this is a rather anemic translation of the information contained in the map, eliding much of the semantic information in the map which is provided by the link labels.

Second, concept maps may have multiple layers of knowledge and information. In INSPIPATION's® translation of a concept map to an outline, only the information in a single level of the map is included in an outline. That is, none of the knowledge or information in any of the child/sub-maps is included. A user may request an outline translation of each sub-map individually. Not only is this cumbersome, but the entire set of knowledge elements, that is, the entirety of the knowledge represented by the overall concept map, may not be viewed in a single outline. Some of the hierarchical relationships among all concepts are lost once several sub-outlines are thus opened, thereby defeating the reason for the outline view.

Third, concept map graphs may have cycles. As a specific example, assume a link connecting nodes A and B with an arrowhead pointing to node B, and a second link pointing from node B to node C, and a third link pointing from node C back to node A. In the INSPIRATION® product's outlines, the link causing the cycle, the link from node C to node A, is ignored. It simply does not appear in the outline. There is no information in the outline portraying the knowledge that C is somehow related to A. In INSPIRATION®, the outline translation of the concept map with the A-to-B-to-C-to-A cycle looks like:

A
  A. B
    1. C

Again, important semantic information contained in the original graph-based knowledge representation is lost in the translation. The outline does not contain the full complement of knowledge that is in the graph.

Therefore, a need exists for a system and method that includes, in outline form, all of the semantic and relational information provided in graphical concept maps.

SUMMARY OF THE INVENTION

A computer-implemented system of the present invention is provided for translating node-and-link knowledge representations to an outline format. The representation includes one or more node objects and one or more link objects. Each link object has a "from node identifier" that identifies the node object in a concept map connected to a link's tail and a "to node identifier" identifying the node object in the concept map to which the link object points. A translation program traverses all of the node objects in a node-and-link representation as directed by the link objects by following links out of each node depending of the link objects' "to node identifier" such that an outline is output having node object information and link object information hierarchically interrelated.

A method for creating an outline by translation of a node-and-link knowledge representation includes providing a concept map or semantic net having one or more node objects. Each node object has: a location of a node in the concept map, and zero or more connecting link objects that connect the node objects. The link objects have a "from node identifier" that identifies the node object in the concept map connected to the link's tail and a "to node identifier" identifying the node in the concept map to which this link points. The concept map is tranlated to an outline by traversing all of the node objects in the concept map as directed by the link objects and following link objects out of each node objects depending of the link object's "to node identifier". The outline is ouput and includes a hierarchical listing of node objects and link objects.

The methods of the present invention may be implemented by a program storage device readable by machine, tangibly embodying a program of instructions executable by the machine to perform method steps for creating an outline by translation of a node-and-link knowledge representation.

These and other objects, features and advantages of the present invention will become apparent from the following detailed description of illustrative embodiments thereof, which is to be read in connection with the accompanying drawings.

BRIEF DESCRIPTION OF THE FIGURES

The invention will be described in detail in the following description of preferred embodiments with reference to the following figures wherein.

DETAILED DESCRIPTION OF PREFERRED EMBODIMENTS

The present invention provides an improved system and method for translating concept maps or semantic networks into an outline format. This disclosure describes a translation method in which the organization of all thoughts and concepts that exist in a concept map, including the names of all inter-concept relationships and all knowledge at all abstraction or sub-map levels, is presented in a single inclusive outline. The present invention also provides that outlines derived via translation of the knowledge and information in a concept map should incorporate all of the semantic information included in that concept map, and at the same time avoid presenting knowledge or information redundantly.

In accordance with the present invention, the translations of the concepts map presented above may include the following:

animal
I. has skin
II. breathes oxygen
. . .

The outline of the second example would look more like (assuming the label on all three links is simply "relationship from <from-node> to <to-node>"):

A
  A. relationship from A to B: B
    1. relationship from B to C: C
      a. relationship from C to A: A The latter outline (1) includes the relationship link information (from the labels that appear on links) and (2) includes that there is a (semantically important) relationship link pointing from node C to node A. This is represented by outline entry A.1.a.

It should be understood that the elements shown in FIGS. may be implemented in various forms of hardware, software or combinations thereof. Preferably, these elements are implemented in software on one or more appropriately programmed general purpose digital computers having a processor and memory and input/output interfaces.

Figure 2A:
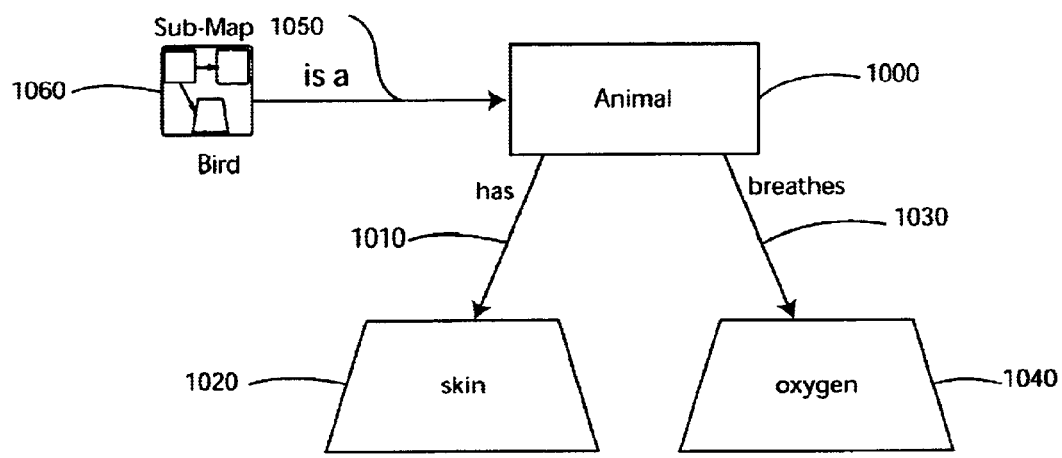
FIGS. 2a–c show hierarchical concept maps or semantic networks with sub-maps for demonstrating the present invention.
Figure 2B:
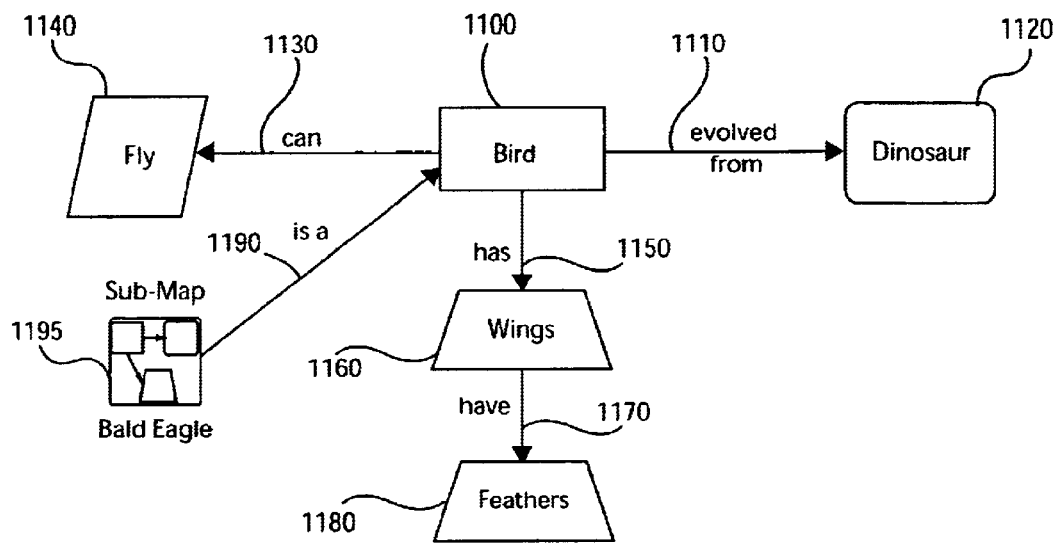
Figure 2C:
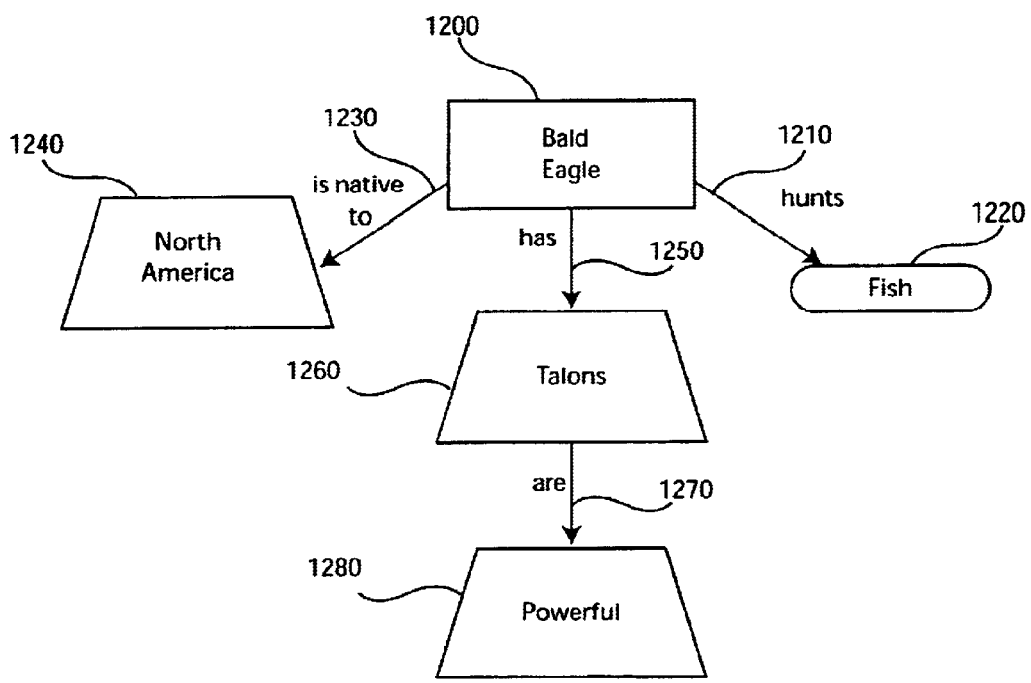

Referring now in detail to the figures in which like numerals represent the same or similar elements and initially to FIGS. 2a–c, FIGS. 2a, 2b, and 2c together comprise an example of a semantic network or concept map about "animals". This example will be used in the following description to illustratively demonstrate the capabilities of the present invention. It is to be understood that the present disclosure considers labeled links, although unlabeled links are handled as well. Furthermore, the present disclosure considers node-and-link knowledge representations, including concept maps and semantic networks, to be (a) graphs composed of labeled nodes and links; (b) such graphs are directed, links have directions indicated by an arrowhead at either or both ends of a link; (c) such graphs may be cyclic, that is, they may include cycles (e.g., there may be a link connecting nodes A and B with an arrowhead pointing to B, and another link connecting nodes A and B with an arrowhead pointing to A; or, there may be a link pointing from node A to node B, another link pointing from node B to node C and a third link pointing from node C back to node A; and so on); and (d) the graph's nodes and links are used to represent knowledge as described above.

In addition, the present invention considers concept maps, semantic networks, graphs that incorporate a sub-net, sub-map, or child map mechanism (hereafter referred to as sub-maps). Sub-maps are used to represent conceptual abstractions and reduce the visual clutter in a node-and-link graph (concept map, semantic net, etc.). In other words, a single concept may actually be an abstraction, that is, a single node at one level of detail but one that represents an arbitrarily complex concept, action, or object at a more detailed level. This single abstraction node may be "expanded" into an elaborated definition of its own which includes multiple concepts/nodes and links.

For example, in a software tool that exemplifies a preferred embodiment of this disclosure, in addition to simple concept nodes (e.g., nodes 1000, 1020 and 1040 in FIG. 2*a*) connected by links (e.g., links 1010 and 1030), sub-map nodes (e.g., sub-map node 1060 in FIG. 2*a*) may also appear in any level of a map. This single element (node) represents a single abstract concept, object, or action in the map level in which the element appears. However, a sub-map node (e.g., 1060 in FIG. 2*a*) may include another (sub-)network (e.g., FIG. 2*b*) of nodes and links, that is, another (sub-)map, representing the elaborated definition of the single concept represented by the sub-map node. The details of this sub-network can be brought into focus, so that its multiple constituent knowledge elements are made visible.

For example, the "Animals" concept map in FIG. 2*a* includes a "Bird" abstraction at the topmost level of the map. An animal node 1000 connects to sub-map 1060 by a link 1050. The abstraction is represented by a single sub-map node 1060 at this level of detail. One may view the elaborated sub-map represented by this single node 1060. FIG. 2*b* shows the details of an example "Bird" sub-map.

FIG. 2*b* includes nodes 1100, 1140, 1160, 1180 and 1120 connected by links 1130, 1150, 1170 and 1110. Submap node 1195 is connected with the main node 1100 by a link 1190. Any one level of an overall concept map may have multiple sub-maps. Sub-maps may be recursive: sub-maps may have sub-maps. For example, the "Bird" sub-map (FIG. 2*b*) has sub-map node 1195 labeled "Bald Eagle," and FIG. 2*c* shows a sample sub-map that would be in (associated with) that sub-map node. FIG. 2*c* includes a main node 1200 and nodes 1240, 1260, 1280 and 1220 connected by links 1230, 1250, 1270 and 1210.

An activity often associated with concept map usage is the organization of ideas in preparation for writing a report, composition, or story. A very common alternative representation for thought or idea organization is an outline. In fact many people are accustomed to and prefer outlines for organizing thoughts when preparing to write prose. In response to this need, a (small) number of concept map tools automate the conversion of concept maps to outlines.

Figure 3:
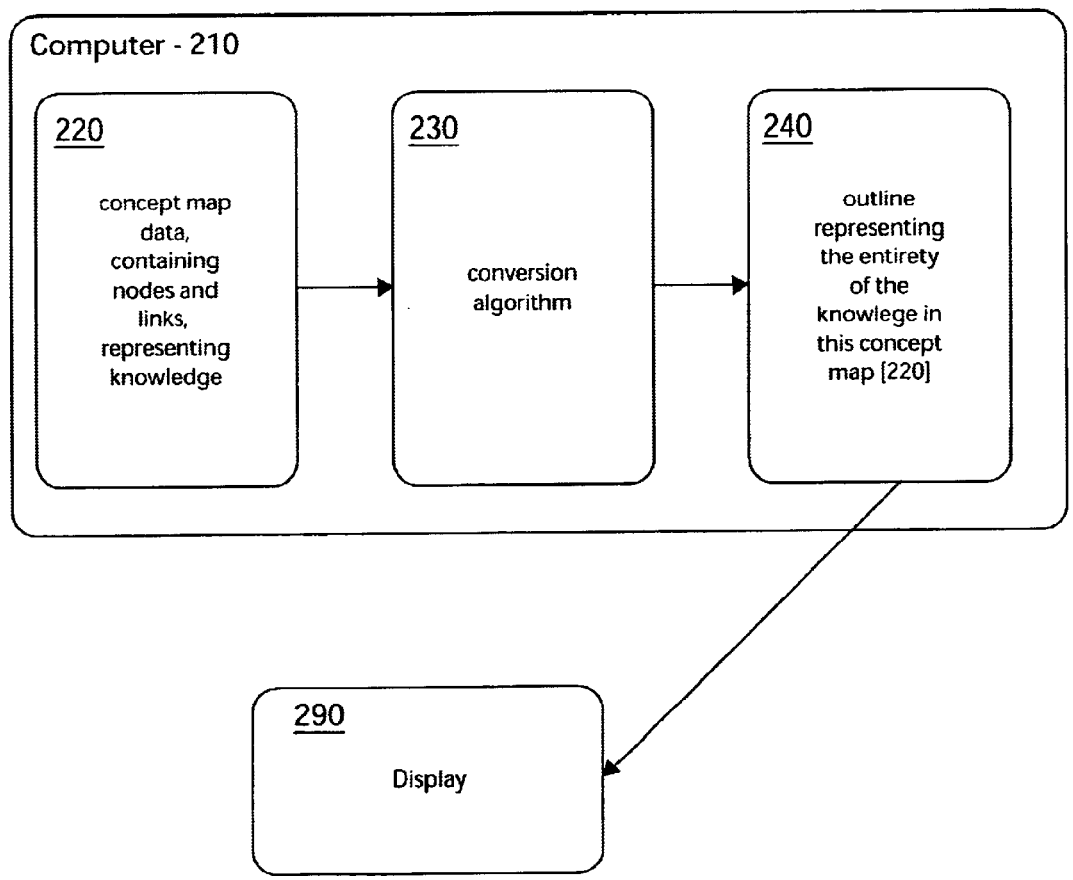
FIG. 3 is a block diagram showing a computer system for implementing the present invention.

Referring to FIG. 3, a block/flow diagram of the system in which the conversion method of the present invention operates is illustratively shown. Block 210 includes a computer in which a software program having a translation/conversion algorithm 230 of the present invention stored in memory. In block 220, a concept map/semantic network/graph that include nodes interconnected by links to represent knowledge is input into computer 210 and/or stored therein. In block 240, an output outline created by the present invention, the conversion algorithm 230 is provided. The output outline 240 includes all of the knowledge and information that is provided in the semantic network 220 but now in an alternative outline format. In a preferred embodiment of the present invention, the outline 240 is displayed on a display monitor 290.

A sample result of using the outline translation method on the concept map of FIGS. 2*a*–*c* results as follows:

Animal
  I. has: skin
  II. breathes: oxygen
  III. Bird
    A. can: fly
    B. has: wings
      1. have: feathers
    C. evolved from: dinosaur
    D. Bald Eagle
      1. hunts: fish
      2. is native to: North America
      3. has: talons
        a. are: powerful
      4. is a: Bird
  E. is a: Animal This outline is the result of using a preferred embodiment of the disclosed method to translate the example concept map portrayed in FIGS. 2*a*–*c*. All of the elements (nodes, links) in the top-level concept map (shown in FIG. 2*a*) as well as the "Bird" sub-map (FIG. 2*b*) and the "Bald Eagle" sub-sub-map (FIG. 2*c*) are present in the outline, and at the appropriate indentation levels.

Each entry in the outline corresponds to one or more elements (nodes and links) in the concept map shown in FIG. 2. The same outline is shown below annotated with numbers corresponding to the knowledge elements in FIG. 2. At the start of each line/entry in the outline is the number (in square brackets) of the corresponding node(s) and, possibly, link shown in FIG. 2. For example, the outline entry annotated [1000] is the entry corresponding to the "Animal" concept node numbered 1000 in FIG. 2*a*; the entry annotated [1010 and 1020] represents the "has" link 1010 and the "skin" node 1020. The entry annotated [1060 and 1100] is a single entry representing two nodes: the "Bird" sub-map node 1060 that appears in the top level of the network (FIG. 2*a*), and the main node 1100 of the corresponding sub-map shown in FIG. 2*b*. The handling of sub-map nodes and the main node of the corresponding sub-map is described below.

| | |
|---|---|
| [1000] | Animal |
| [1010 and 1020] | I. has: skin |
| [1030 and 1040] | II. breathes: oxygen |
| [1060 and 1100] | III. Bird |
| [1130 and 1140] |   A. can: fly |
| [1150 and 1160] |   B. has: wings |
| [1170 and 1180] |     1. have: feathers |
| [1110 and 1120] |   C. evolved from: dinosaur |
| [1195 and 1200] |   D. Bald Eagle |
| [1210 and 1220] |     1. hunts: fish |
| [1230 and 1240] |     2. is native to: North America |
| [1250 and 1260] |     3. has: talons |
| [1270 and 1280] |       a. are: powerful |
| [1190 and 1100] |     4. is a: Bird |
| [1050 and 1000] | E. is a: Animal |

For example, in FIG. 2*a* we can see that "Bird" 1060 is a subordinate concept to the top-level "Animal" concept 1000. Thus, in the outline, the entry for "Bird" (annotated [1060 and 1100], entry III., appears at the first subordinate hierarchical level below "Animal" (annnotated [1000]), that is, at the first indentation level.

Then, elements 1110 through 1195 of the "Bird" submap, the elements below the main "Bird" node 1100 of that submap, appear below the "Bird" entry in the outline (entry III.) and indented further. For example, in the "Bird" submap in FIG. 2b, the concept node "fly" 1140 is directly connected to the "Bird" concept node 1100, by the relationship link labeled "can" 1130. Thus, in the outline, "fly" (along with its connecting link "can") appear a single level deeper than "Bird"—in the outline "can: fly" appears as entry III. A. (annotated as [1130 and 1140]) at the immediately subsequent indentation level after "III. Bird".

Also in FIG. 2b, "wings" 1160 appears one level away (one relationship link away) from "Bird" 1000 and the "feathers" concept 1180 is one additional level further away from "Bird" 1000 but directly linked to (a single level away from) "wings" 1160. The corresponding outline entries show "wings" (along with its connecting link "has") one level below and indented to the right from "Bird." The "has: wings" entry appears at III. B. (annotated as [1150 and 1160]), one hierarchical level below (and indented to the right of) III. Also, "feathers" (along with its relationship link "have") appears at the next indentation level (one more level below and indented further). It is entry III. B. 1 (annotated as [1170 and 1180]), one level deeper than entry III. D.

Carrying this scheme further, the "Bald Eagle" sub-map node 1195 is one level subordinate to (one link away from) the "Bird" node 1100 in FIG. 2b. Thus, it appears as item "III. D. Bald Eagle" in the outline (the entry annotated [1195 and 1200], one level subordinate to the "III. Bird" entry. The elements (1210 through 1280) subordinate to the "Bald Eagle" node 1200 in the submap shown in FIG. 2c then appear at the appropriate subordinate levels of the outline. For example, the "hunts" link 1210 connects "Bald Eagle" 1200 to the "fish" concept 1220. In the outline, this gives rise to the entry "III. D. 1. hunts: fish" (annotated as [1210 and 1220]).

The textual labels that appear on relationship links are integrated into outline entries providing more complete information and a more accurate translation of the knowledge in the concept map. As examples, see the first two entries below item III. D., e.g., a bald eagle "hunts: fish" (the entry annotated as [1210 and 1220]) and "is native to: North America" (the entry annotated as [1230 and 1240]). If a relationship link has no label, then the outline could simply have no text prefixing the node's label. For example, for a node link with no label, pointing to a node labeled "North America", the outine entry would look like, e.g., "IV. North America". Alternatively a default link label could be used for the text of the outline entry, in which case the entry might look like, e.g., "IV. is related to:Whatever". The colon in each entry's text may be considered optional; if elided, an entry would look instead like, for example: "III. D. 2. is native to North America."

Figure 1:
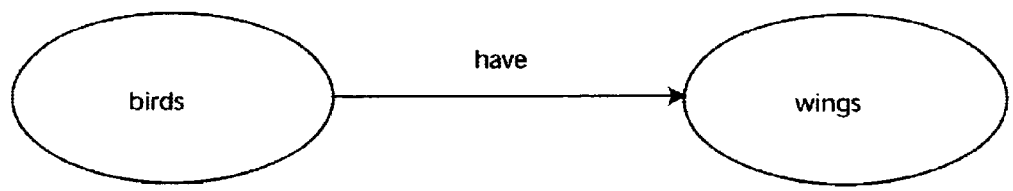
FIG. 1 is a concept map employed to demonstrate the present invention.

The text of each outline entry depends on the direction of each relationship link: when a link, X, between nodes A and B has an arrowhead pointing to node B, then subordinate to the entry for A itself will be an outline entry that includes: <X's label> followed by an optional colon, followed by 1 space, followed by <B's label>. For example, for the concept map of FIG. 1 ("birds have wings"), the corresponding outline in accordance with the present invention would look like:

birds

A. have: wings optionally, of course, the main node ("birds") may be a labeled entry instead of a bulleted entry, for example, "A. birds," in which case the "have: wings" entry would still appear one level subordinate to "birds" as follows:

A. birds 1. have: wings

Alternatively, a root or main node entry of the outline, corresponding to the root node in the concept map or semantic network, may simply appear as the first outline entry with no prefix or "item ID" label, as in the following:

birds

A. have: wings

These choices are a matter of preference and do not alter the content of this disclosure.

The present methods may assume that each level of the map, including the top level, has a node that the concept map author has designated as the main or central node, the node to start with on that level. In a preferred embodiment, the main node is visually distinguished by being surrounded by a three-dimensional border—for example, the "Animal" node 1000 in the top level map and the "Bird" node 1100 in the sub-map in FIG. 2a. If, at any level, the concept map does not have a designated main node, the concept-map-to-outline method chooses one. In a preferred embodiment, the topmost node in a given map level (that is, in the topmost level of the map or in any sub-map) is chosen as the main node. This heuristic assumes concept map authors build their maps top-down, with the most important node being the topmost. If there is a tie for topmost node, i.e., if 2 or more nodes are equivalently topmost, then among those, the node closest to the left-right center position is selected.

The method of the present invention performs a recursive depth-first traversal of nodes, beginning with the main node of the topmost level of the graph/net/map, and traversing according to the directions indicated by links' arrowheads. Then, the same depth-first traversal is performed for each of those nodes, if any, that have not been traversed by the depth-first traversal that began at the main node.

Because these graphs are directed, there may exist nodes that cannot be reached when performing the traversal from the main node. Such an "outlier" node could have a directed link pointing to some other node, but no link pointing to itself from any node that can be reached by traversing directed links from the main node.

Figure 4:
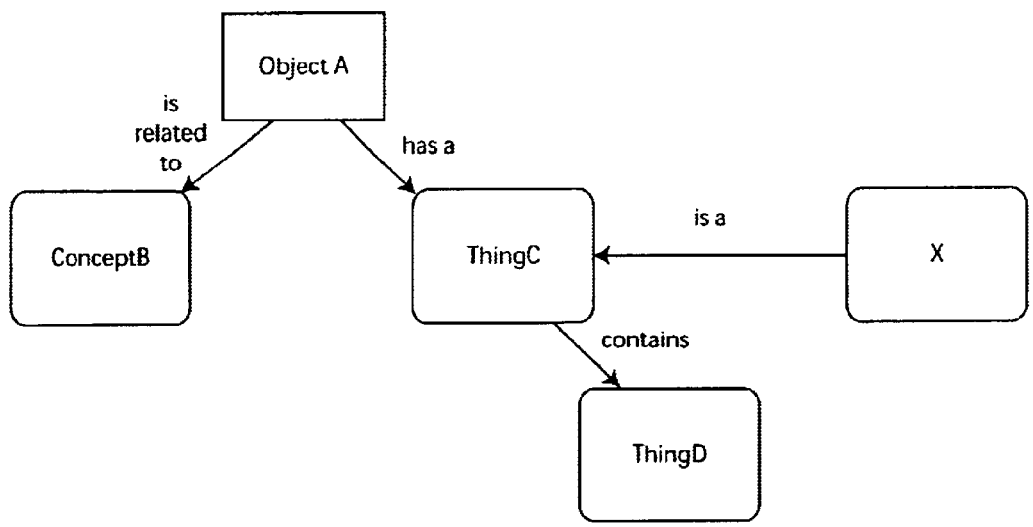
FIG. 4 shows a concept map with a node "X" which is identified in accordance with the present invention.

For example, if a directed traversal of a graph shown in FIG. 4 begins at a main node, "ObjectA", the traversal would not touch node "X" using prior methods. In contrast, the method of the present invention handles the conversion of such outlier nodes to the outline in the steps described in the next paragraph.

Figure 5:
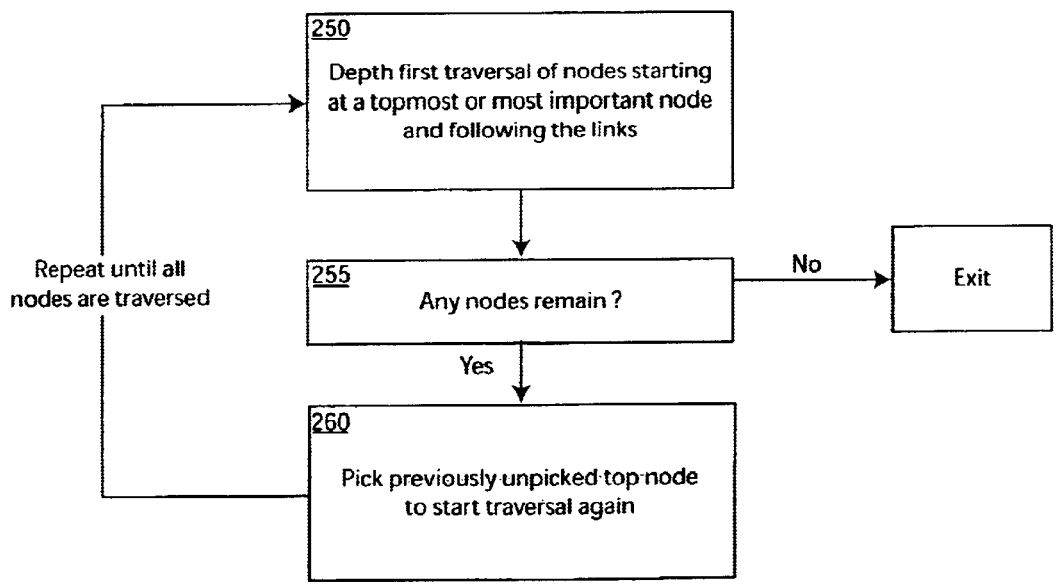
FIG. 5 is a flow diagram showing a method for traversing a concept map in accordance with the present invention.

Referring to FIG. 5 with continued reference to FIG. 4, the method performs the following steps for each level of a concept map. First, in block 250, the method does a depth-first traversal of nodes starting with the main node and following the directed links. Then, in block 255, the method checks to see if any nodes remain which have not yet been output to the outline. If any exist, in block 260, the topmost such node is picked as the starting point for performing a new depth-first traversal (If there is a tie for topmost node, one of the equivalently topmost nodes is arbitrarily picked). After performing this depth-first traversal, this process of handling outlier nodes (steps 255 and 260) is repeated until there are no nodes remaining that have not been converted/output to the outline.

The method returns to step 255 to again find any nodes that have still not yet been output because in the course of traversing depth-first from outlier node A, the traversal may visit and output node B which formerly had not been output. In this way, node B (which was formerly among the not-output-yet nodes) will not be output twice to the outline.

Figure 6:
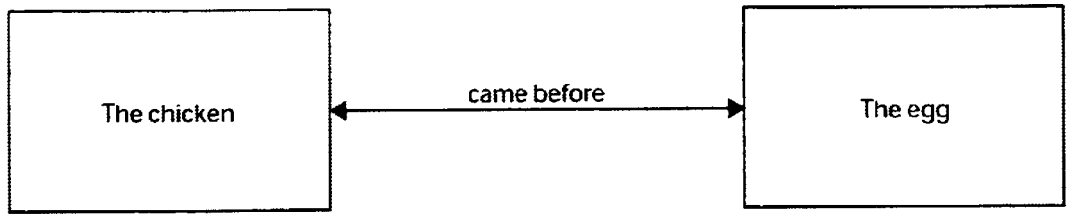
FIG. 6 is a concept map having a cyclic link which can be handled in accordance with the present invention.

Graphs representing knowledge (semantic nets, concept maps) may also include cycles. These result in an outline that (a) includes all the relevant information found in the graph, and (b) does not redundantly duplicate information. The first type of cycle of caused by the fact that links may be bi-directional. FIG. 6 shows a bi-directional cycle. A corresponding outline includes the information that "the chicken came before the egg" and "the egg came before the chicken". So the outline looks like (assuming "The chicken" as the starting concept for purposes of the outline):

The chicken
  A. came before: The egg
    1. came before: The chicken

Compare this result to other conventional products for this same concept map, which provide only:

The chicken
  A. The egg

In addition to not including the knowledge represented by link labels, not every relationship among concepts is represented in the outlines of the conventional products.

The present invention provides that in a graph that contains cycles (e.g., FIG. 6), infinite loops are prevented by the translation method by flagging each node as "has been output" when the node has first been completely output to the outline. This flag is checked in the method to prevent repeatedly following and translating the links outgoing from each node, as shown below:

The chicken
  A. came before: The egg
    1. came before: The chicken
      a. came before: The egg
        I. came before: The chicken
          i. came before: The egg
            . . .

In another type of cycle, a particular node may be visited twice (or more times) in the course of traversing all directed links in a graph. When this occurs, the information about subordinate links and nodes of the node (call the node A), that is, the links pointing from A to other node(s) and those thereby connected nodes, is not output to the outline twice (or more times). Advantageously, this information is only incorporated in the outline once.

Using a simpler example for clarity, the concept map in FIG. 4 will be used to show that if a node, A, is visited more than once while performing the depth-first traversal from from the main node and from outlier nodes. Node A's subordinated details, information about the links leading out from node A and the other nodes connected by those links, are not repeated.

FIG. 4 includes an "outlier" node, X, a node that is not traversed by performing a depth-first traversal from the root node. Because links are directed, a traversal of nodes starting at the main node, labeled "ObjectA", and following links along their directions, does not reach node "X". As described earlier, to handle this case the method of the present invention first performs a depth-first traversal of nodes starting with the main node, then checks to see if any nodes remain which have not yet been output to the outline (outliers), and if any exist the topmost such node is picked as the starting point for performing a new depth-first traversal.

After accounting for the outlier node "X," the algorithm winds up traversing to node "ThingC" twice, first when traversing the graph from "ObjectA" and then when traversing from "X". Nonetheless the subordinate details of "ThingC" do not appear twice in the outline. The outline corresponding to FIG. 4 is shown below. The first time node "ThingC" is visited, its subordinate details are output to the outline (the entry "A. contains: ThingD" which is subordinate to entry II., the first entry for "ThingC"). When node "ThingC" is later re-visited by following the link from "X" to "ThingC", an entry for the node (its label along with the link's label, entry III. A.) is output rid to the outline, but its subordinate details, i.e., the links leading out from node "ThingC," are not repeated. The outline includes:

ObjectA
  I. is related to: ConceptB
  II. has a: ThingC
    A. contains: ThingD
  III. X
    A. is a: ThingC One other notable feature of the conversion method is its handling of sub-map labels in outlines. Again, in any level of a map there may be a sub-map node (a single node representing a more elaborated map of nodes and links). The sub-map node has a label assigned by the concept map author. When the associated sub-map is brought into view, the sub-map has a main node which also has a label. If the labels of these two nodes are identical, which is often the case, the two nodes should be represented in the outline by a single entry, rather than two separate entries.

If possible the method collapses the two entries for a sub-map node and the main node of the corresponding sub-map in a single outline entry. The method may be programmed to be conservative in doing so and only performs this flattening of the two nodes into one outline entry if they have the identical label.

Figure 7:
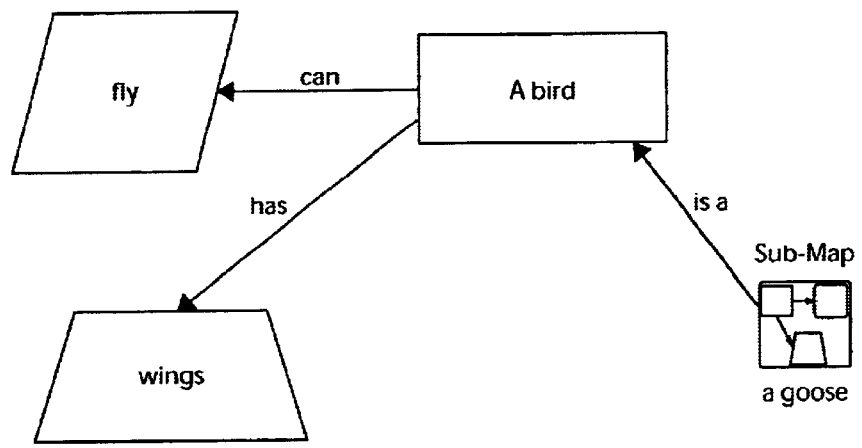
FIGS. 7 and 8 show hierarchical concept maps or semantic networks with sub-maps for demonstarting the present invention.
Figure 8:
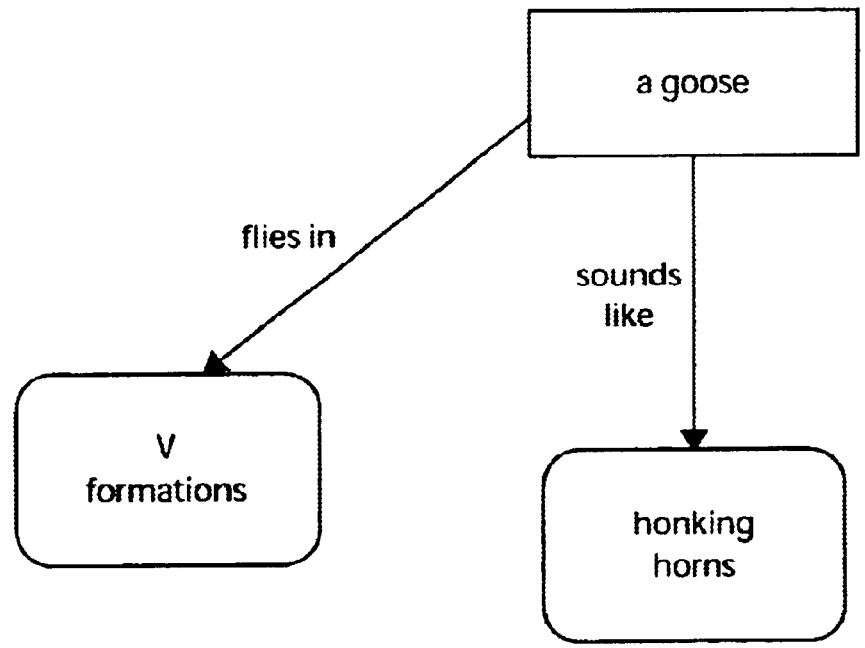

Beginning with a simple example for clarity, FIG. 7 is a main level of a concept map about birds. This top level includes a sub-map node labeled "a goose". FIG. 8 is a sub-map associated with the "a goose" submap node in FIG. 7. Here, the main node of the sub-map is also labeled "a goose", the same label as on the sub-map node itself.

The folowing outline is produced by the translation method of the present invention for the concept map of FIGS. 7 and 8:

a bird
  I. has: wings
  II. can: fly
  III. a goose
    A. flies in: V formations
    B. sounds like: honking car horns
    C. is a: a bird As implemented by the translation method, the outline for this concept map does not have an outline entry for the sub-map node and a second separate entry for the main node of the corresponding sub-map. Instead, they are "melded" into the same entry, and the subordinate details for the main node of the sub-map (III.A. and III.B. in Example 16) appear one indentation level, e.g., one hierarchy level down, e.g., below the single "a goose" entry in the outline. This results in a more understandable and cleaner outline, without redundancies.

Without this feature, the outline for this concept map would look like the outline below, with two redundant entries (III and III.A.):

a bird
  I. has: wings
  II. can: fly
  III. a goose
    A. a goose
      1. flies in: V formations
      2. sounds like: honking car horns
    B. is a: a bird Because the method of the present invention "knows" that the two nodes identically labeled "a goose," logically represent the same knowledge element. The two nodes are melded together in the outline and represented by a single entry. And all entries subordinate to the main node of the sub-map (all nodes connected to it) appear at their appropriate level, one level subordinate to the entry for the main node of the sub-map.

To avoid illogical semantic errors, the present invention performs this flattening of the two nodes into one outline entry only when they both have the identical label. Label equivalents may also be employed to facilitate flattening. For example, two different labels may be equated as equals. In this case, flattening of the two nodes may be performed if equivalent uses exist. Other criteria may be employed as well.

Returning to FIGS. 2a–c, if the present invention did not provide flattening as described above, the outline for this concept map would be as shown below. The outline below includes redundant information and is less comprehensible than the outline provided by the present invention. With regard to redundancy, for example, entry III. and its subordinate entry III.A. have the identical label, as do entries III.A.4. and III.A.4.a. The non-flattened outline is as follows:

Animal
I. has: skin
II. breathes: oxygen
III. Bird
  A. Bird
    1. can: fly
    2. has: wings
      a. have: feathers
    3. evolved from: dinoaurs
    4. Bald Eagle
      a. Bald Eagle
        i. hunts: fish
        ii. is native to: North America
        iii. has: talons
          a) are: powerful
        iv. is a: Bird
    5. is a: Animal The present invention instead produces the outline shown previously for FIGS. 2a–c. That outline has a single entry (entry III.) representing both the "Bird" sub-map node 1060 and the corresponding main node 1100 of the associated sub-map shown in FIG. 2b. (This single outline entry is also shown in the annotated outline as [1060 and 1100]). The annotated outline also has another single entry (entry III.D., shown in the annotated outline as [1195 and 1200]) for the "Bald Eagle" sub-map node 1195 and the corresponding main node 1200 of the associated sub-map.

The Translation Method

Figure 9:
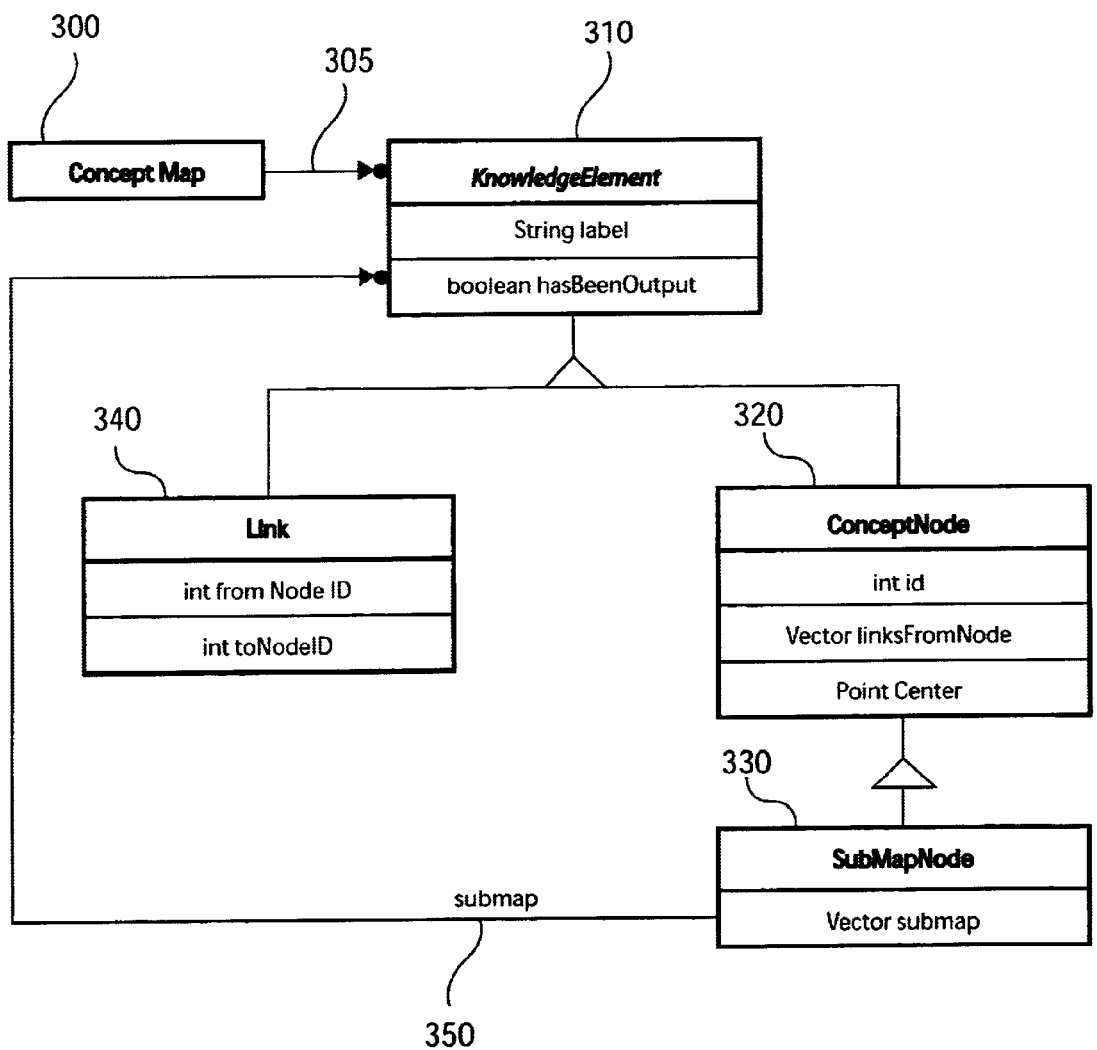
FIG. 9 is a UML (Unified Modeling Language) diagram of the objects used to represent data and their relationships as employed in one embodiment of the present invention.

Referring again to FIG. 3, translation program 230 takes a graph 220(semantic net, concept map) as input. A graph in this context is a set of nodes interconnected by links. In a preferred embodiment, nodes and links are represented in the software by objects (as in an object-oriented languauge such as JAVA™). FIG. 9 shows the attributes of the classes defining these objects and how they are related. This information is shown as a UML diagram (with the addition of identifying numbers for purposes of identification); UML is a standard notation for portraying information about software objects. FIG. 9 also shows the hierarchy of knowledge element (node and link) classes.

Referring now to FIG. 9, KnowledgeElement 310 is an abstract class. Actual objects in a graph are instances of the "node" classes, ConceptNode 320 or SubmapNode 330. Link 340 objects connect a node on one end of the link to another node on the other link end. SubmapNode 330 is a subclass of, and thereby inherits instance variables (attributes of objects) and behavior from, ConceptNode 320, which is in turn a subclass of KnowledgeElement 310. So a ConceptNode 320 object (an instance of the ConceptNode 320 class) has instance variables id, its unique identifier; linksFromNode, a collection of all the Link objects that point from the ConceptNode to some other node; center which indicates the node's location in the concept map; as well as the two variables inherited from KnowledgeElement 310: label, the node's textual label, and the flag hasBeenOutput, which is used by the method disclosed here.

A SubmapNode 330 object includes all of these instance variables/attributes plus submap 350 which points to a collection (a Java Vector object) having zero or more KnowledgeElements 310 comprising the sub-map 350 associated with a sub-map node. A Link 340 object includes the IDs of the node at its tail and the node at its head, in addition to label and hasBeenOutput which its class inherits from the KnowledgeElement class 310. Each Link 340 object has a specific direction, that is, it points from the node at its tail to the node at its head. Thus, each Link 340 object has a "from node identifier" that identifies the node object in the concept map connected to the link's tail and a "to node identifier" identifying the node in the concept map to which the link points.

When a bi-directional link, X, connects nodes A and B in a concept map (as in the example of FIG. 6), this is internally represented in a preferred embodiment of a concept map tool that incorporates the disclosed translation method by having two Link 340 objects, one pointing from node A to node B and a second pointing from B to A. A concept map 300 includes a collection 305 of one or more KnowledgeElement instances.

In the following discription, the general term "map" is used to mean graph, network, net, or concept map, and "sub-map" is used to mean child map, sub-map, sub-network, sub-net, or sub-graph as described above. Numbers in the text correspond to the numbers in FIGS. 10, 11 and 12 which depict a flow diagram for the present invention.

Figure 10:
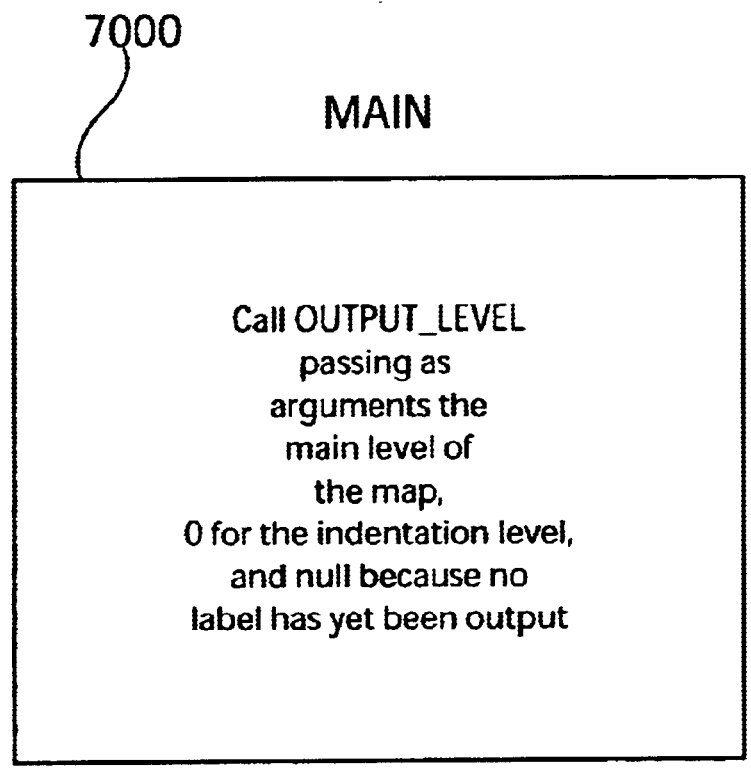
FIG. 10 is a flow diagram of a main program for a graph-to-outline conversion/translation method in accordance with the present invention.

Referring to FIG. 10, a main program block 7000 is shown. In block 7000, a subroutine OUTPUT_LEVEL is called. OUTPUT_LEVEL is called for the top level of the map and sets an initial indentation level 0. Null is used as the most recently output label:

OUTPUT_LEVEL (main level map, 0, null)

Figure 11:
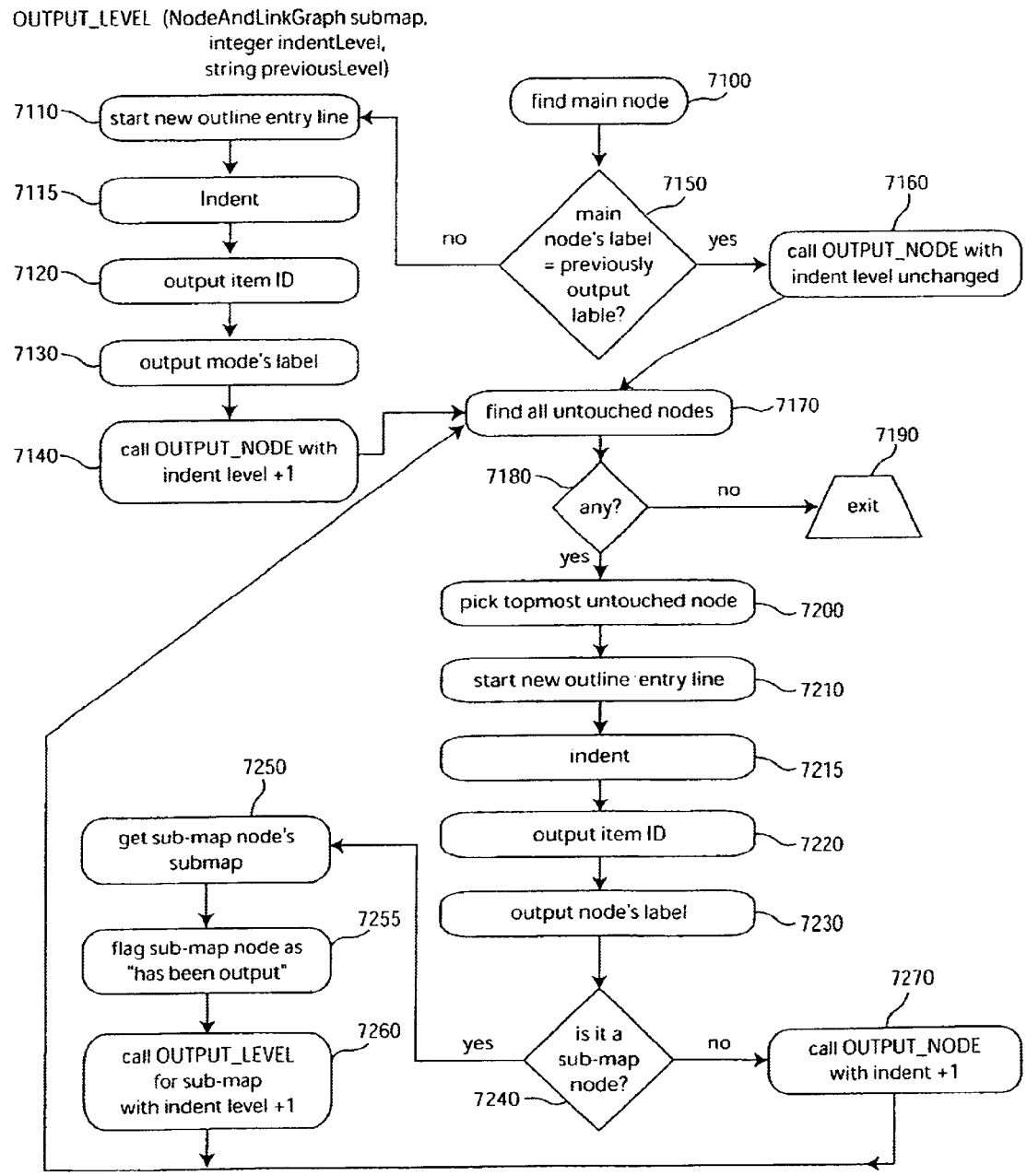
FIG. 11 is a flow diagram of an output_level function called by the main program of FIG. 10 for a graph-to-outline conversion/translation method in accordance with the present invention.

Referring to FIG. 11, a function, OUTPUT_LEVEL, is shown. Function, OUTPUT_LEVEL, includes arguments "submap", "indentLevel", and "previousLabel". These provide the following:

"submap" is the top level/main map or a sub-map/sub-net

"indentationLevel" indicates the current level of the hierarchy in the outline

"previousLabel" is the label of the node most recently output to the outline; this is meaningful when "submap" is actually a sub-map as opposed to the topmost level of the overall concept map The function OUTPUT_LEVEL (OUTPUT_LEVEL (nodeAndLinkGraph submap, integer indentationLevel, string previousLabel) includes the following. In block 7100, the main node of the current level of the map (in argument "submap", i.e., "submap" is the current level of the map) is found. This can be called current node A. The algoirthm provides that each level of the map/graph, including the top level, have a node that is designated as the main or central node because that is used as the starting node for the initial depth-first traversal of nodes on that level of the map/graph.

The main node for each level is usually chosen by a user of the interactive concept map software tool (for example, the "Animal" node 1000 in the top level map shown in FIG. 2*a* and the "Bird" node 1100 in the sub-map in FIG. 2*b*.) It is possible that a concept map created by a user may not have a main node specified at each and every level. At the time of execution of the map-to-outline algorithm, if any level of the concept map does not have a designated main node, the map-to-outline algorithm chooses a node. The algorithm uses a heuristic method in choosing one node as the "main" node and this heuristic is based on the manner in which people usually create concept maps. For example, people often build concept maps top-down wherein the main/central/most important node of any level is the topmost node. It also tends to be placed/located at or near the horizontal center of the map. Thus, in a preferred embodiment, the top-most node in a given map level (i.e., in the topmost level of the map or in any sub-map) is chosen as the main node for that level. When there is a tie for the topmost node, that is, if two or more nodes are equivalently topmost, then among those the node closest to the horizontal center position may be selected. The heuristic may weight the nodes based on position or any other suitable criteria for selecting the topmost or main node.

In block 7150, if A's label is not equal to previousLabel, then in block 7110, start a new line of the outline being output. In block 7115, spaces are output to indent the current outline entry as appropriate for the current indentation level. For example, (4*indentationLevel) spaces are output.

In block 7120, output the next "outline item ID" (prefix), as appropriate, for the current indentation level. For example, in a preferred embodiment, at indentation level 1, the item id's are Roman numerals I, II, III . . . , at level 2, they are capitals letters A, B, C, . . . at the 3rd level the outline item IDs are 1, 2, 3 . . . , at the 4th level the IDs are lowercase letters a, b, c . . . and so on. This is a standard notation for outlines. Other notations may be used as well. In an optional special case:

If indentationLevel=0, output a dot/bullet for the "item ID", or output nothing for the "item ID", according to implementer's preference. This may only occur for the root node of the entire outline.

In block 7130, output node A's label, and, in block 7140, call function OUTPUT_NODE for node A, and at the next indentation level:

OUTPUT_NODE (A, indentationLevel+1).

In block 7150, if A's label=previousLabel, then in block 7160, call OUTPUT_NODE with the indentation level unchanged. By not outputing a new outline entry here for node A, redundant entries are eliminated for a sub-map node and the main node of its associated sub-map when the two nodes have the same label:

OUTPUT_NODE (A, indentationLevel)

Iteratively traverse all untouched (not yet traversed; not yet output) nodes.

In block 7170, find all nodes in argument "submap" (the current level of the map/sub-map) that have not yet been marked "has been output". This is checked in block 7180. In block 7190, if there are no remaining untouched nodes, the program exits and returns to the caller.

If untouched nodes remain, in block 7200, the program picks the topmost of all such nodes and calls this node A (if there is a tie among multiple nodes for the topmost one, arbitrarily pick one of those tied or use predetermined criteria to resolve the tie). In block 7210, a new line in the outline is started. In block 7215, spaces are output to indent current outline entry as appropriate for the current indentation level. In block 7220, the next "outline item ID" is outputed as appropriate for the current indentation level. Node A's label is output in block 7230.

In block 7240, if A is a sub-map node, then retrieve the sub-map associated with sub-map node A in block 7250; call this sub-map SM. In block 7255, mark node A as "has been output". In block 7260, call OUTPUT_LEVEL (SM, indentation level+1, A's label). Then, return to step 7170.

In block 7240, if A is not a sub-map node, then call OUTPUT_NODE (A, indentation level+1) in block 7270. Then, return to block 7170, and after each untouched node is output to the outline, the program returns to block 7170 to re-find any untouched nodes at that point. This is because traversing nodes from one untouched node may involve traversing/touching a previously untouched node. This advantageously prevents outputing an initially untouched node more than once.

Figure 12:
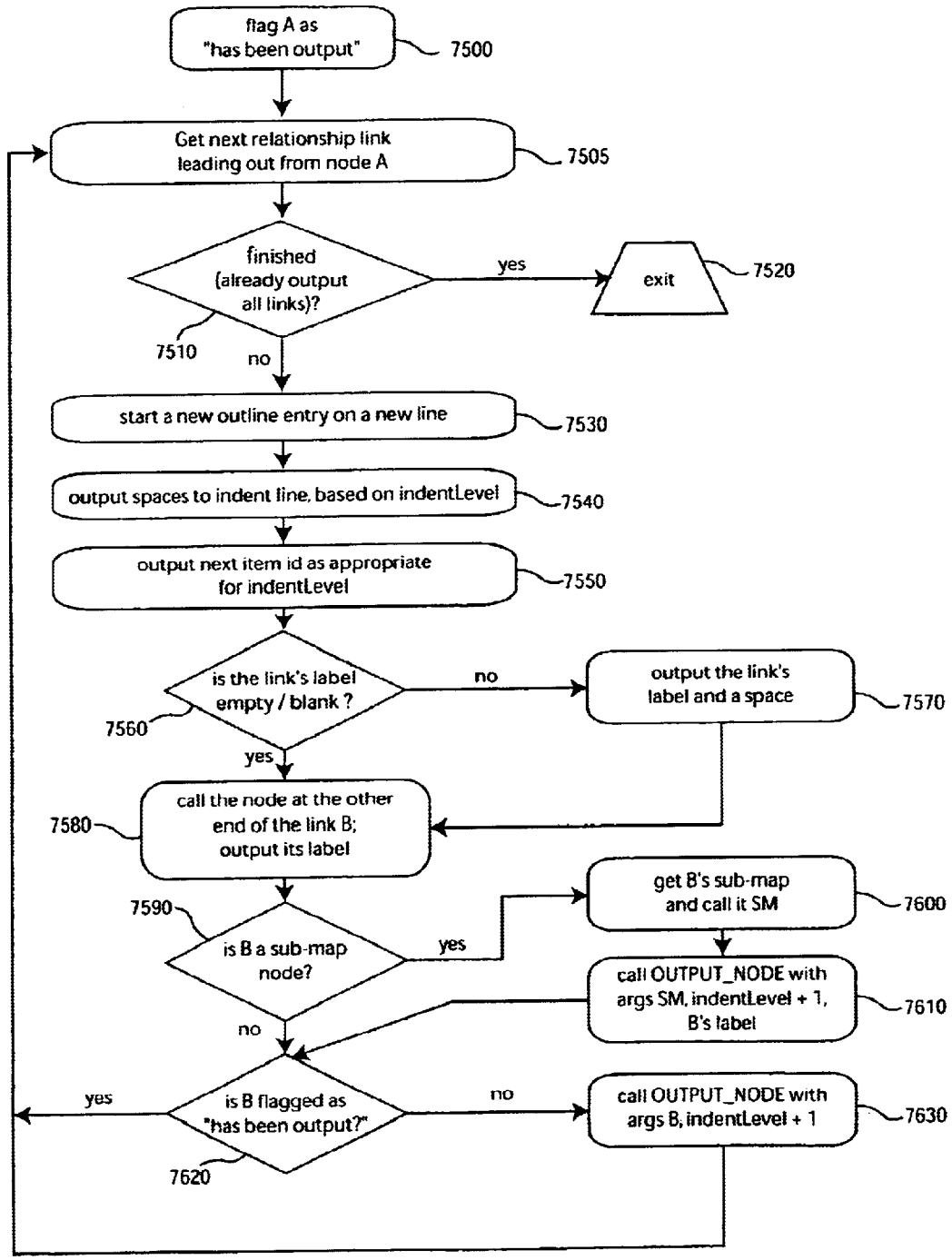
FIG. 12 is a flow diagram of an output_node function called by the output_level function of FIG. 11 for a graph-to-outline conversion/translation method in accordance with the present invention.

Referring to FIG. 12, the function, OUTPUT_NODE, is described in more detail. OUTPUT_NODE (OUTPUT_NODE (node A, integer indentLevel)) includes arguments "A" AND "indentLevel", where:

A is a node; Output all the links leading from node A; and indentLevel is the current level of indentation.

In block 7500, mark node A as "has been output". In blocks 7505 to 7630, iteratively, for each and every (if any) relationship link that is connected at one end to A AND that has an arrowhead pointing to another node B (has a direction pointing from A to B (regardless of whether it is Of bi-directional and thereby also has an arrowhead pointing to A)) perform the following:

In block 7505, the next relationship link leading out from node A is obtained. In block 7510, if there are no remaining links to process, exit OUTPUT NODE at block 7520. Otherewise continue.

In block 7530, start a new line (new entry) in the outline. In block 7540, output (4 * indentLevel) spaces. This indents the entries at each subsequently higher indentation level further to the right of its superordinate entry. (The integer 4 here can be any integer, preferably a single digit number). In block 7550, the next "outline item ID" is output as appropriate for the current indentation level. In block 7560, if the relationship link from node A to node B has a non-empty label, then:

1) output the link's label in block 7570
2) output ":" (this step is optional)
3) output 1 space character In block 7560, if the relationship link from node A to node B has a label which is empty/blank, then:

1) output default "is related to"
2) output ":" (this step is optional)
3) output 1 space character
4) Or: alternatively, instead of the preceding steps 1) through 3), if the link's label is blank, output nothing here (the choice is according to user preferences).

In block 7580, label the node that the link points to "B" and output the textual label of node B. In block 7590, if B is a sub-map node, then retrieve the sub-map associated with sub-map node B; call this sub-map SM in block 7600. In block 7610, call OUTPUT_LEVEL for the sub-map (OUTPUT_LEVEL (SM, indentation level+1, previousLabel)). Thus, the program performs a depth-first traversal recursively for each sub-map node touched by the traversal.

In block 7620, if node B has not yet been marked as "has been output" (this test prevents infinite looping in this method caused by cycles in the map), then, in block 7630, OUTPUT_NODE is called for the node B to output all the links leading from B: OUTPUT_NODE (B, indentation level+1). This makes the algorithm recursively perform a depth-first traversal for each concept node touched by the traversal. Return to block 7500 to check the next relationship link leading out from node A.

Having described preferred embodiments of a system and method for converting node-and-link knowledge representations to outline format (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A computer-implemented system for translating node-and-link knowledge representations to an outline format, comprising:
   one or more node objects;
   one or more link objects, each link object having a "from node identifier" that identifies the node object in a concept map connected to a link's tail and a "to node identifier" identifying the node object in the concept map to which the link object points; and
   a translation program that traverses all of the node objects in a node-and-link representation as directed by the link objects, following links out of each node depending on the link objects' "to node identifier" such that an outline is output having node object information and link object information hierarchically interrelated.

2. The system as recited in claim 1, wherein the node objects include one or more sub-maps.

3. The system as recited in claim 2, wherein the one or more sub-maps include node objects and link objects.

4. The system as recited in claim 1, wherein the node-and-link representation includes at least one of directed and cyclic representations.

5. The system as recited in claim 1, wherein each node object includes a location of a node in the node-and-link representation, zero or more connecting links that connect the node to other nodes in the node-and-link representation, a textual label for the node, a unique numeric node identifier, and an output flag.

6. The system as recited in claim 5, wherein the outline includes textual labels found on all relationship links in the node-and-link representation.

7. The system as recited in claim 1, wherein the node-and-link representation includes a concept map or semantic net.

8. The system as recited in claim 1, wherein the outline is a singular outline and includes all knowledge elements, including the node objects and the links objects in all levels including a top level graph and all child networks, sub-maps, sub-networks, sub-nets, child maps.

9. The system as recited in claim 1, wherein the outline includes a hierarchy, the hierarchy being conveyed by levels of indentation level in the outline.

10. The system as recited in claim 1, wherein the translation program outputs single entries to avoid redundant labels when representing multiple layers in the outline of the node-and-link representation.

11. The system as recited in claim 10, wherein the node-and-link representation includes node objects having multiple links and the translation program avoids duplication of knowledge by including information about a particular node objects's subordinate links and nodes only once even if multiple nodes point to that node.

12. A method for creating an outline by translation of a node-and-link knowledge representation, comprising the steps of:
   providing a concept map or semantic net having one or more node objects, each node object having a location of a node in the concept map, zero or more connecting link objects that connect the node objects, the link objects having a "from node identifier" that identifies the node object in the concept map connected to the link's tail and a "to node identifier" identifying the node in the concept map to which this link points; and
   translating the concept map to an outline by:
      traversing all of the node objects in the concept map as directed by the link objects and following link objects out of each node objects depending of the link object's "to node identifier"; and
      outputting the outline including a hierarchical listing of node objects and link objects.

13. The method as recited in claim 12, wherein the step of outputting includes outputting textual labels on all relationship links in the node-and-link representation.

14. The method as recited in claim 12, wherein the hierarchical listing includes all knowledge elements including nodes and links in all levels, the levels including the knowledge represented by a top level graph and all child networks, sub-maps, sub-networks, sub-nets, child maps, of the entire node-and-link representation.

15. The method as recited in claim 12, further comprising the step of indenting entries in the hierarchical listing to represent the hierarchy.

16. The method as recited in claim 12, further comprising the step of minimizing redundancies regarding outline entries resulting in redundant labels in multiple layers or levels in node-and link representations.

17. The method as recited in claim 12, further comprising the step of avoiding duplication of knowledge by including information about a particular node's subordinate links and nodes only once even if multiple links point to that node.

18. The method as recited in claim 12, further comprising the step of selecting a main node to begin the traversing step based on criteria used by creators of a concept map.

19. The method as recited in claim 18, wherein the criteria includes selecting a top-most and horizontally centered node first.

20. A program storage device readable by a machine, tangibly embodying a program of instructions executable by the machine to perform method steps for creating an outline by translation of a node-and-link knowledge representation, the method steps comprising:
   receiving a concept map or semantic net having one or more node objects, each node object having a location of a node in the concept map, zero or more connecting link objects that connect the node objects, the link objects having a "from node identifier" that identifies the node object in the concept map connected to the link's tail and a "to node identifier" identifying the node in the concept map to which this link points; and
   translating the concept map to an outline by:
      traversing all of the node objects in the concept map as directed by the link objects and following link objects out of each node objects depending of the link object's "from node identifier" and "to node identifier"; and outputting the outline including a hierarchical listing of node objects and link objects.

21. The program storage device as recited in claim 20, wherein the step of outputting includes outputting textual labels on all relationship links in the node-and-link representation.

22. The program storage device as recited in claim 20, wherein the hierarchical listing includes all knowledge elements including nodes and links in all levels, the levels including the knowledge represented by a top level graph and all child networks, sub-maps, sub-networks, sub-nets, child maps, of the entire node-and-link representation.

23. The program storage device as recited in claim 20, further comprising the step of indenting entries in the hierarchical listing to represent the hierarchy.

24. The program storage device as recited in claim 20, further comprising the step of minimizing redundancies regarding outline entries resulting in redundant labels in multiple layers or levels in node-and link representations.

25. The program storage device as recited in claim 20, further comprising the step of avoiding duplication of knowledge by including information about a particular node's subordinate links and nodes only once even if multiple links point to that node.

26. The program storage device as recited in claim 20, further comprising the step of selecting a main node to begin the traversing step based on criteria used by creators of a concept map.

27. The program storage device as recited in claim 26, wherein the criteria includes selecting a top-most and horizontally centered node first.

* * * * *